Patented June 15, 1937

2,083,894

UNITED STATES PATENT OFFICE 2,083,894

PROCESS FOR THE TREATMENT OF SULPHUR COMPOUNDS

Gerald C. Connolly, Baltimore, Md., assignor to Sulco Laboratories, Inc., New York, N. Y., a corporation of Delaware No Drawing. Application December 21, 1933, Serial No. 703,408

9 Claims. (Cl. 23—3)

This invention relates to a process for the treatment of sulphur containing compounds and to the preparation of improved impregnated leached dried hydrous oxide gel catalysts which may be utilized in the removal of sulphur compounds from gases or vapor.

More specifically this invention relates to the manufacture of highly efficient and improved impregnated leached dried hydrous oxide gel catalysts for removing hydrogen sulphide from gases by oxidizing the hydrogen sulphide to elementary sulphur and sulphur dioxide, and also for the conversion of organic sulphur compounds in vaporous state into hydrogen sulphide.

U. S. Patent 1,895,724, of which I am copatentee, discloses such gas and vapor treating processes with the use of an impregnated gel catalyst, the gel of which has a pore structure capable of adsorbing not less than 10 percent. of its own weight (dry basis) of water vapor, when in equilibrium with water vapor at 30° C., and a partial pressure of 22 mm. of mercury. Such gel is impregnated with from 1.3 to 4.87 percent. of a metallic oxide. While the resulting catalyst is useful, it has several very serious drawbacks which interfere with its effective use on a commercial scale, chief among which are:

(1) The gel used is relatively dense and has such a minute pore structure that only a limited amount of active catalyst can be introduced. The patent points out that even with 4.87% $Fe_2O_3$ some of the pores of the gel are clogged and the active surface of the gel reduced. This dense structure and limited amount of active catalyst is a serious drawback in actual practice, as the capacity is low and the process must be frequently interrupted and the mass revivified. This revivification not only interrupts the process, but it must be carried out at high temperatures, sometimes very excessive temperatures in order to burn the sulphur and the carbon, which accumulate within the pores. In such heating the gel structure becomes even more dense due to a shrinking of the pores. The patent allows for a range of metallic oxide of from 1.3 to 4.87 percent. but it points out that best results are obtained at about 2.5 percent. Any material change in the gel structure is equivalent to a shifting from this desired 2.5 percent.

(2) After such a catalyst has been used, particularly when the mass is used intermittently, there is a certain displacement of the metallic oxide in the gel, so that particles will show about 5 percent. of metallic oxide whereas others will show only about one percent. or so. This may be explained by the fact that in treating gas which contains $SO_2$ or in which $SO_2$ is formed, a small amount of $SO_3$ is formed which changes some of the iron oxide to iron sulphate, which sulphate, being water soluble, is displaced from one portion of the gel bed to another by the water adsorbed between the runs or formed during the reaction, etc. This, too, impairs the catalytic efficiency as the mass is no longer uniformly impregnated with the desired 2.5 percent. of metallic oxide; but, rather, some particles are over impregnated and others are under impregnated.

(3) The preferred conversion temperature range disclosed in the patent is from about 185° C. to about 210° C. This is a very narrow temperature-efficiency range, especially when dealing with gases high in hydrogen sulphide, because the heat of reaction alone is sufficient to exceed this temperature and steps must be taken to cool the mass during use unless operating efficiency is sacrificed.

For the above reasons, among others, it has been found in practice that the catalyst disclosed in U. S. Patent 1,895,724 drops in use not only in percentage efficiency of conversion, but the time necessary before revivification is essential, is materially shortened. This drop continues after each revivification until finally an equilibrium seems to be reached, at which time the catalytic mass, taking efficiency and duration of cycle into consideration, is not more than about half as good a catalyst as was the original fresh material.

The catalytic masses, prepared in accordance with the principles of the present invention, have none of the disadvantages above pointed out. The present improved catalysts are not sensitive; they will operate over a considerable range of temperature; they may contain say from about 5 up to about 20 percent, metallic oxide, with the result that any small amount of displacement by the leaching normally occurring will not impair their efficiency; they will withstand repeated high temperature reactivation; and they can be operated at higher gas rates and concentrations than formerly, without necessitating cooling. Above all, they will give higher efficiencies for a longer length of time than the former mass and retain this efficiency after repeated revivifications.

The nature of the improved catalytic masses may best be described by giving in detail one method of preparation. The method will be described for silica but alumina, titania etc. gels, all referred to herein generically as hydrous oxide gels, or mixtures thereof, can also be used.

A hydrous oxide of silica may be prepared by any means, but preferably by reacting sodium silicate and an acid, both in proper proportions, to form a hydrogel. The hydrous oxide is then washed with water preferably, but not essentially, at 150 to 200° F. until practically all reaction salts are removed. Washing with warm water lessens the time of washing somewhat, but also gives the gel a lower apparent density, that is, larger pores.

The washed hydrous oxide of silica is next immersed in a salt solution, for example, a solution of calcium chloride. The concentration of the solution is regulated so as to obtain the amount of impregnation and hence the ultimate size of pores desired. For example, for an ultimate product having about 0.5 apparent density (8–14 mesh material) the hydrous oxide is impregnated with from 35 to 40 per cent of calcium chloride on the dry weight of the silica.

The hydrous oxide of silica containing the salt is next dried, for instance, at a temperature of about 150° C. to 200° C. The resultant dried product is silica gel impregnated throughout with calcium chloride.

This intermediate product, if need be, is then allowed to stand to adsorb moisture, or wet steam is passed over it, until the particles are saturated with water, in order to avoid decrepitation in the subsequent step as it is desirable to keep the particles in a granular state.

The calcium chloride impregnated silica gel is now washed with water, preferably at about 200° F. until practically all the calcium chloride is removed. The drained resultant product is dried and finally activated for 3 or more hours at a temperature of about 1400° F. This high temperature activation will so shrink the structure that there will be no further change on any subsequent use.

The product thus obtained is a tough, granular form of silica containing comparatively large pores of relatively uniform size and has an apparent density just under 0.50. By apparent density, I mean the weight in grams of a cubic centimeter of gel consisting of particles of 8–14 mesh material. By 8–14 mesh, I mean particles that will pass an 8 mesh U. S. standard sieve series screen, but will remain on one of 14 mesh.

In contrast to the heretofore known types of gel catalysts, as disclosed, for example, in U. S. Patent 1,895,724, a gel prepared as above and of the density indicated has substantially no absorptive capacity for water vapor at 30° C. and at a pressure of 22 mm. of mercury. The pores should not, however, be so enlarged as to lose the advantage of the gel structure.

The above description gives a very satisfactory method for making an excellent catalytic mass suitable for use in oxidizing hydrogen sulphide to elementary sulphur and sulphur dioxide. Various modifications of this method are possible. Alumina, titania, etc. either alone or mixed with silica can be made by the same procedure. Other methods might be used for obtaining the desired low apparent density and tough structure of the carrier. Other salts might be used to impregnate the hydrous oxides or it is possible that certain compounds can be added at the mixing of the solutions and these compounds removed from the dried product by leaching with acid. However, I prefer to impregnate the washed hydrous oxide with a salt leachable with water.

After the heating to about 1400° F., the leached gel is preferably allowed to cool and is then impregnated with the active catalyst. The active catalyst can be introduced by any suitable means, as by spraying on or immersing in a salt solution capable of being decomposed into the metal oxide by heat or the carrier may be first saturated with a reducing gas or liquid and the metal salt added. I prefer to spray onto the carrier sufficient of the salt solution of the proper concentration just to saturate the pores and leave the surfaces with a dry appearance. As much as 20 percent. of the active metallic oxides may thus be introduced into the structure.

Various active catalysts can be used, depending on whether the final catalyst is to be used for the oxidation of hydrogen sulphide or for the conversion of organic sulphur compounds into hydrogen sulphide. For the oxidation of hydrogen sulphide, I can use oxides of iron, aluminum, vanadium, manganese, etc., or a mixture of the same. Preferably, because of its cheapness, I use iron oxide or iron oxide plus some manganese oxides. For the conversion of organic sulphur compounds into hydrogen sulphide, I can use the oxides of nickel, molybdenum, chromium, etc., preferably ranging from equal parts of nickel and molybdenum oxides to 20 parts of molybdenum oxide to 80 parts of nickel oxide. The nitrate is a preferred salt for decomposing to form the active catalysts, although, with molybdenum, the ammonium salt may be used.

The carrier containing the metallic salt is dried and then activated at a temperature of about 1200° F. At this temperature all the salt is decomposed, leaving the carrier impregnated on its surfaces and in its pores with the highly active metal oxides.

Catalytic masses prepared according to the above method are extremely efficient, rugged and can be used a long time before revivification is necessary. Furthermore, they can be revivified without impairing their efficiency.

As will be appreciated by one skilled in the art, the above catalytic masses thus prepared are especially useful in the conversion of volatile or volatilized organic sulphur compounds into hydrogen sulphide and in the recovery of elemental sulphur from hydrogen sulphide by catalyzing the reaction between hydrogen sulphide and an oxidizing gas such as sulphur dioxide, air or the like. In this manner, hydrogen sulphide and organic sulphur compounds can be removed readily from natural gases, cracked petroleum gases, coke oven gases and the like, or they may be treated in their more concentrated or pure forms, as aforesaid. In the claims appended hereto, such reactions are referred to generically as the treatment of sulphur compounds in gaseous form.

For recovering elementary sulphur from hydrogen sulphide I pass the raw gas blended with an oxidizing gas, as air, $SO_2$, etc., in slight excess above that theoretically necessary to react with the hydrogen sulphide, through a bed of the granular catalytic mass. With the preferred catalytic mass described and containing up to 20 percent. but preferably 10 to 15 percent. of ferric oxide as the active catalyst, I have found that for a gas mixture containing 4 percent. hydrogen sulphide and containing 10 percent. oxygen above theoretical and a rate of one cubic foot of gas per pound of catalytic mass per minute and operating at a temperature of from 150° C. to well over 300° C., all the hydrogen sulphide can be converted. More particularly, with a gas reasonably free from gum and heavy hydrocarbons, under the conditions just stated I have found that using a single stage converter operating at 280° to 300° C., after more than 75 hours more than 90 per cent. of the hydrogen sulphide was still converted over to elemental sulphur, while the remainder of the hydrogen sulphide, except for a bare trace (as detected by lead acetate paper) was converted into sulphur dioxide.

I have given certain efficiency figures for conversion of hydrogen sulphide to elementary sulphur and sulphur dioxide by these catalysts. These results are obtained at about 300° C. and using an excess amount of oxygen of about 10 percent. above theoretical. At a somewhat lower temperature there is a slightly higher conversion. Increasing the excess oxygen sufficiently and raising the temperature somewhat it is possible to convert all the hydrogen sulphide into sulphur dioxide. This sulphur dioxide may be used to feed a contact sulphuric acid plant when feasible or ammonia may be added and the sulphur dioxide recovered as ammonium sulphite, as described. By this adjustment of temperature and excess of oxygen, we have a method of controlling the proportion of elementary sulphur and sulphur dioxide. The higher the temperature the less the excess of oxygen necessary, and vice versa.

The elemental sulphur, produced from the oxidation of the sulphur dioxide, may be recovered in several ways. Part of the sulphur may be caught in a catch-pot located just below the catalytic chamber, while the remainder, which is carried through as mist, may be removed by a Cottrell precipitator arranged in a steam jacketed pipe. The exact conditions of the sulphur and the point it is recovered varies depending upon the gas rates, H₂S concentration, temperature, etc.

The sulphur dioxide formed will go on with the gas and may be removed by any suitable means. For example, it may be removed in a scrubber located after the Cottrell precipitator. This scrubber may contain a suspension of lime or, if much carbon dioxide is in the gas, a suspension of finely divided calcium carbonate may be used. Another suitable method is that of introducing ammonia gas into the gas stream to form ammonium sulphite which, if finely divided, may be recovered in a second Cottrell precipitator, or any suitable collector. The ammonium sulphite when spread in thin layers exposed to the air, will quickly oxidize to ammonium sulphate, a readily marketable product.

Instead of treating a raw or dilute gas directly, the hydrogen sulphide may first be recovered or concentrated by some suitable absorption process, for example, one using triethanolamine or the like as the absorbing agent, and the concentrated hydrogen sulphide thereafter mixed with air, or air and an inert gas, and passed through a bed of the catalyst, as described.

Indications are that if the gas is clean of tar, gums, etc., the catalyst will last a very long time before revivification is necessary. The present results obtained with my improved catalytic mass are far superior to those obtained by any catalyst tested. Besides the mass is much more flexible.

For the conversion of organic sulphur into hydrogen sulphide I have found that, for example, by passing a gas containing sufficient hydrogen and 50 grains of carbon bisulphide per 100 cubic feet over my improved type of catalyst containing approximately equal parts of nickel oxide and molybdenum oxide, at least 90 percent. was converted into hydrogen sulphide at a temperature of approximately 325° C.

All the catalytic masses described in this application may be regenerated back to their active form by merely heating to a temperature of from 1000 to 1200° F. while passing over and through the mass a current of air, and in such regeneration they will not shrink or otherwise change in a manner to lose their efficiency.

In the foregoing specification, and in the claims annexed hereto, my catalyst carriers have been defined in terms of their pore size. It should be understood that this is the size of the pores before they have been impregnated with active catalysts; that is, the size of the pores in the carrier itself and not in the finished catalyst. Of course, impregnation of the carrier with active catalyst material will to a certain extent diminish the size of the pores, and other alterations in the pore size of the catalyst may take place during the active life thereof. It is understood that catalysts in which these changes have occurred are also included within the scope of the invention.

Having described my invention, what I claim as new and desire to secure by Letters Patent is:

1. A process for the treatment of gases containing sulphur compounds of the class consisting of hydrogen sulphide and organic compounds of sulphur which comprises passing said gases in admixture with a reacting gas at reaction temperatures in contact with a catalyst mass comprising an active catalyst impregnated into a hydrous oxide gel carrier having an apparent density of about 0.5 when measured on particles of 8–14 mesh in size, said gel carrier having pores so large that it exhibits substantially no absorptive capacity for water vapor at 30° C. and 22 mm. of pressure, said pores being of a size similar to those produced in a hydrous oxide of silica when it is immersed in a calcium chloride solution of a concentration such that 35–40% of the calcium chloride is impregnated therein and the hydrous oxide containing the salt is then dried, washed with hot water until the calcium chloride is removed, and the product is dried and activated by heating.

2. A process for the treatment of gases containing sulphur compounds of the class consisting of hydrogen sulphide and organic compounds of sulphur which comprises passing said gases in admixture with a reacting gas at reaction temperatures in contact with a catalyst mass comprising an active catalyst impregnated in amounts of 5–20% by weight into a hydrous oxide gel carrier having an apparent density of about 0.5 when measured on particles of 8–14 mesh in size, said gel carrier having pores so large that it exhibits substantially no absorptive capacity for water vapor at 30° C. and 22 mm. of pressure, said pores being of a size similar to those produced in a hydrous oxide of silica when it is immersed in a calcium chloride solution of a concentration such that 35–40% of the calcium chloride is impregnated therein and the hydrous oxide containing the salt is then dried, washed with hot water until the calcium chloride is removed, and the product is dried and activated by heating.

3. A process for the treatment of gases containing hydrogen sulphide which comprises passing said gases in admixture with an oxidizing gas at temperatures of 150–300° C. in contact with a catalyst mass comprising an active catalyst impregnated into a hydrous oxide gel carrier having an apparent density of about 0.5 when measured on particles of 8–14 mesh in size, said gel carrier having pores so large that it exhibits substantially no absorptive capacity for water vapor at 30° C. and 22 mm. of pressure, said pores being of a size similar to those produced in a hydrous oxide of silica when it is immersed in a calcium chloride solution of a concentration such that 35–40% of the calcium chloride is impregnated therein and the hydrous oxide containing the salt is then dried, washed with hot water until the calcium chloride is removed, and the product is dried and activated by heating.

4. A process for the treatment of gases containing hydrogen sulphide which comprises passing said gases in admixture with an oxidizing gas at temperatures of 150–300° C. in contact with a catalyst mass comprising an active catalyst impregnated in amounts of 5–20% by weight into a hydrous oxide gel carrier having an apparent density of about 0.5 when measured on particles of 8–14 mesh in size, said gel carrier having pores so large that it exhibits substantially no absorptive capacity for water when in equilibrium therewith at 30° C. and 22 mm. of pressure, said pores being of a size similar to those produced in a hydrous oxide of silica when it is immersed in a calcium chloride solution of a concentration such that 35–40% of the calcium chloride is impregnated therein and the hydrous oxide containing the salt is then dried, washed with hot water until the calcium chloride is removed, and the product is dried and activated by heating.

5. A process for the treatment of gases containing hydrogen sulphide which comprises passing said gases in admixture with an oxidizing gas at temperatures of 150–300° C. in contact with a catalyst mass comprising iron oxide impregnated in amounts of 5–20% by weight into a hydrous oxide gel carrier having an apparent density of about 0.5 when measured on particles of 8–14 mesh in size, said gel carrier having pores so large that it exhibits substantially no absorptive capacity for water vapor at 30° C. and 22 mm. of pressure, said pores being of a size similar to those produced in a hydrous oxide of silica when it is immersed in a calcium chloride solution of a concentration such that 35–40% of the calcium chloride is impregnated therein and the hydrous oxide containing the salt is then dried, washed with hot water until the calcium chloride is removed, and the product is dried and activated by heating.

6. A process for the treatment of gases containing organic sulphur compounds which comprises passing said gases in admixture with hydrogen at reaction temperatures in contact with a catalyst mass comprising an active catalyst impregnated into a hydrous oxide gel carrier having an apparent density of about 0.5 when measured on particles of 8–14 mesh in size, said gel carrier having pores so large that it exhibits substantially no absorptive capacity for water vapor at 30° C. and 22 mm. of pressure, said pores being of a size similar to those produced in a hydrous oxide of silica when it is immersed in a calcium chloride solution of a concentration such that 35–40% of the calcium chloride is impregnated therein and the hydrous oxide containing the salt is then dried, washed with hot water until the calcium chloride is removed, and the product is dried and activated by heating.

7. A process for the treatment of gases containing organic sulphur compounds which comprises passing said gases in admixture with hydrogen at reaction temperatures in contact with a catalyst mass comprising nickel oxide in amounts of 5–20% by weight impregnated into a hydrous oxide gel carrier having an apparent density of about 0.5 when measured on particles of 8–14 mesh in size, said gel carrier having pores so large that it exhibits substantially no absorptive capacity for water vapor at 30° C. and 22 mm. of pressure, said pores being of a size similar to those produced in a hydrous oxide of silica when it is immersed in a calcium chloride solution of a concentration such that 35–40% of the calcium chloride is impregnated therein and the hydrous oxide containing the salt is then dried, washed with hot water until the calcium chloride is removed, and the product is dried and activated by heating.

8. A process for the treatment of gases containing organic sulphur compounds which comprises passing said gases in admixture with hydrogen at reaction temperatures in contact with a catalyst mass comprising molybdenum oxide in amounts of 5–20% by weight impregnated into a hydrous oxide gel carrier having an apparent density of about 0.5 when measured on particles of 8–14 mesh in size, said gel carrier having pores so large that it exhibits substantially no absorptive capacity for water vapor at 30° C. and 22 mm. of pressure, said pores being of a size similar to those produced in a hydrous oxide of silica when it is immersed in a calcium chloride solution of a concentration such that 35–40% of the calcium chloride is impregnated therein and the hydrous oxide containing the salt is then dried, washed with hot water until the calcium chloride is removed, and the product is dried and activated by heating.

9. A process for the treatment of gases containing organic sulphur compounds which comprises passing said gases in admixture with hydrogen at reaction temperatures in contact with a catalyst mass comprising nickel and molybdenum oxides in amounts of 5–20% by weight impregnated into a hydrous oxide gel carrier having an apparent density of about 0.5 when measured on particles of 8–14 mesh in size, said gel carrier having pores so large that it exhibits substantially no absorptive capacity for water vapor at 30° C. and 22 mm. of pressure, said pores being of a size similar to those produced in a hydrous oxide of silica when it is immersed in a calcium chloride solution of a concentration such that 35–40% of the calcium chloride is impregnated therein and the hydrous oxide containing the salt is then dried, washed with hot water until the calcium chloride is removed, and the product is dried and activated by heating.

GERALD C. CONNOLLY.